United States Patent
Liu

(10) Patent No.: US 6,810,561 B1
(45) Date of Patent: Nov. 2, 2004

(54) ON A WHEEL OF A RACK

(75) Inventor: Wen-Che Liu, Taipei (TW)

(73) Assignee: Taiwan Ultra Power Industries Ltd., Taichung City (TW)

( * ) Notice: Subject to any disclaimer, the term of this patent is extended or adjusted under 35 U.S.C. 154(b) by 48 days.

(21) Appl. No.: 10/413,291

(22) Filed: Apr. 15, 2003

(51) Int. Cl.7 .............................................. B60B 33/00
(52) U.S. Cl. ............................... 16/42 T; 16/38; 16/37; 16/31 A
(58) Field of Search ...................... 16/42 T, 43, 31 R, 16/31 A, 38, 39, 45, 20; 248/188.8, 188.9, 188.91

(56) References Cited

U.S. PATENT DOCUMENTS

| | | | | |
|---|---|---|---|---|
| 3,210,795 A | * | 10/1965 | Fontana et al. ................ | 16/43 |
| 3,249,960 A | * | 5/1966 | Schultz, Jr. .................... | 16/37 |
| 4,361,930 A | * | 12/1982 | Seesengood .................... | 16/38 |
| 4,793,021 A | * | 12/1988 | Deasy et al. .................... | 16/37 |
| 4,805,260 A | * | 2/1989 | Tooth .............................. | 16/37 |
| 5,052,075 A | * | 10/1991 | Harris ............................. | 16/38 |
| 5,390,393 A | * | 2/1995 | Reppert et al. ................. | 16/21 |
| 5,813,090 A | * | 9/1998 | Miles ............................. | 16/37 |

* cited by examiner

Primary Examiner—Chuck Y. Mah
(74) Attorney, Agent, or Firm—Rosenberg, Klein & Lee

(57) ABSTRACT

A wheel of a rack consists of a wheel support, a sleeve inserted into a tube of a rack, a supporting member joined to both the sleeve and a top of the wheel support, and a screw projecting from the supporting member and screwed into the sleeve; a step-shaped portion being formed on top of the supporting member to fit with a cavity on the sleeve bottom; a resilient C-shaped ring being fitted around an annular groove of the sleeve to contact an inner side of the tube; the groove being shaped so that a sideways facing portion thereof tapers off towards a lower end; thus, the ring will move to the bigger upper section of the sideways facing annular portion to be pressed against the inner side of the tube with bigger pressure when a downward force is applied on the sleeve.

3 Claims, 5 Drawing Sheets

ON A WHEEL OF A RACK

BACKGROUND OF THE INVENTION

1. Field of the Invention

The present invention relates to a wheel, more particularly one, which is used with a rack, and made in such manner as to be securely and steadily joinable to a vertical tube of the rack, and of which service life is relatively long.

2. Brief Description of the Prior Art

Conventional wheels of racks can be general grouped into ones usable with racks for supporting heavy objects, and ones usable with racks for relatively light objects. Referring to FIGS. 5, and 6, a wheel 10 suitable for use with racks for heavy objects includes a wheel part, a connecting sleeve 130, and a connecting part consisting of a round platform 110 and a screw 120; the connecting sleeve 130 has a screw hole, and is screwed to the screw 120, and closely inserted into a lower end of a vertical support tube 140 of a rack for connecting the wheel 10 to the rack. Wheels suitable for use with racks for light objects are usually formed with, like wheels of office chairs, an up-projecting connecting post for insertion into a lower end of a vertical tube of a rack.

The first kind of wheels are found to have a disadvantage that the connecting sleeve 130 is prone to separate from the tube 140 and the screw 120 when the rack is being moved around, especially when the rack is loaded with heavy objects, because the sleeve 130 is merely inserted into the tube 140 without any securing means provided on the joint between both, and because the sleeve 130 is merely connected to the screw 120 by means of screw threads, and is merely supported on the round platform 110 without any securing means provided on the joint between both. Furthermore, the screw 120 can be bent and damaged due to the heavy load if the sleeve 130 becomes loose on the screw 120.

SUMMARY OF THE INVENTION

It is a main object of the present invention to provide a wheel, which can be securely and steadily joined to a vertical tube of a rack; thus, the wheel can't become loose or separate from the rack even if the rack is being moved around with heavy load.

The wheel of this invention consists of a wheel support for holding a wheel part in position, a sleeve inserted into a lower end of one vertical tube of a rack, a supporting member joined to both the sleeve and a top of the wheel support, a screw projecting upwards from the polygonal portion and screwed into a screw hole of the sleeve, a round step-shaped portion formed on top of the supporting member to fit with a cavity on a lower end of the sleeve, a corrugated surface formed on an annular portion of the sleeve for increasing friction, and a resilient C-shaped ring fitted around an annular groove of the sleeve; the ring contacts an inner side of the tube to prevent the sleeve from separating from the tube; the annular groove is shaped so that a sideways facing annular portion thereof tapers off towards a lower end, i.e. similar to an middle section of an outer side of an inverted cone.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
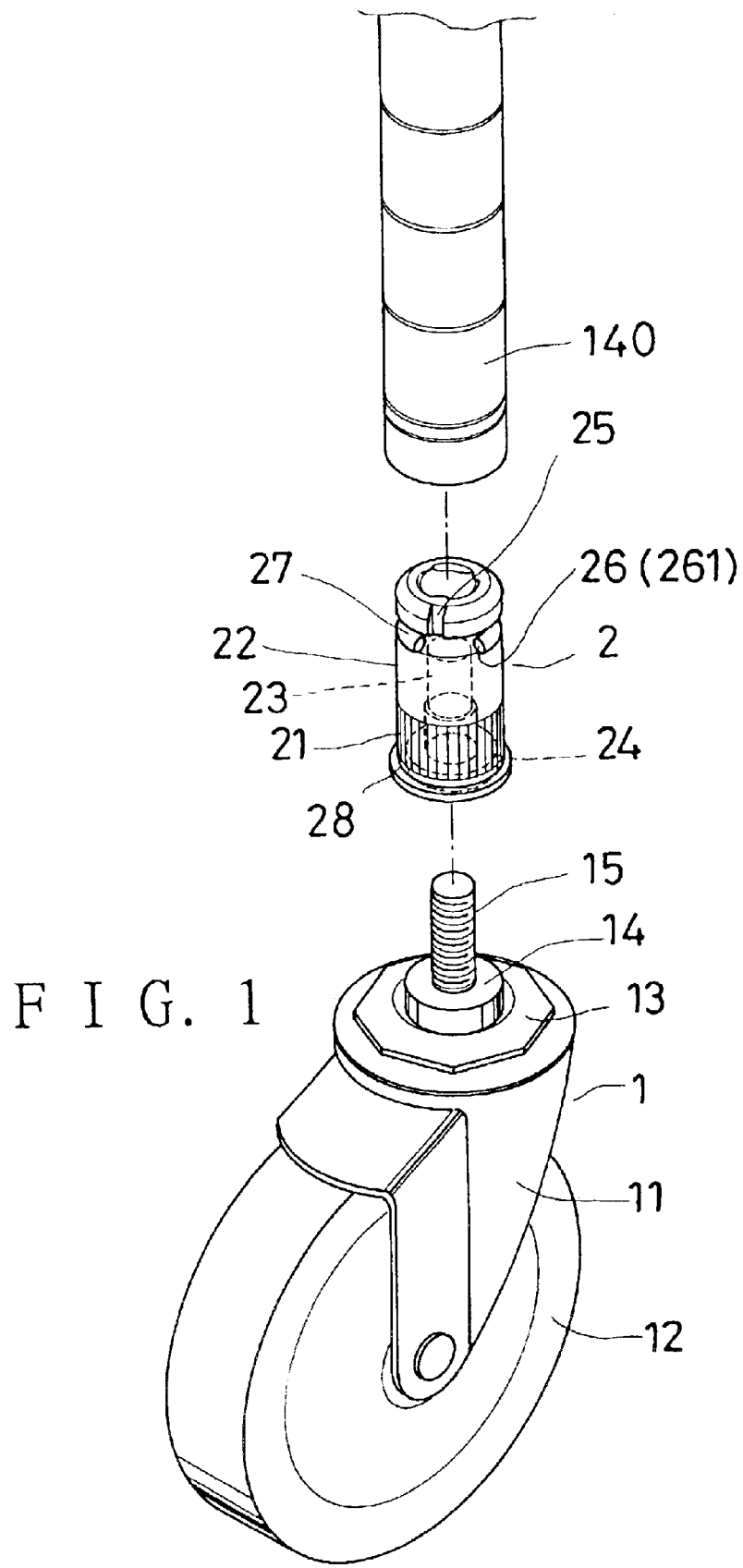
FIG. 1 is an exploded perspective view of the wheel of a rack according to the present invention.

Referring to FIG. 1, a preferred embodiment of a wheel 1 of a rack in the present invention includes a support 11, a wheel part 12 connected to the support 11, a supporting platform 13 pivotally connected to a top of the support 11, and a connecting sleeve 2.

Figure 2:
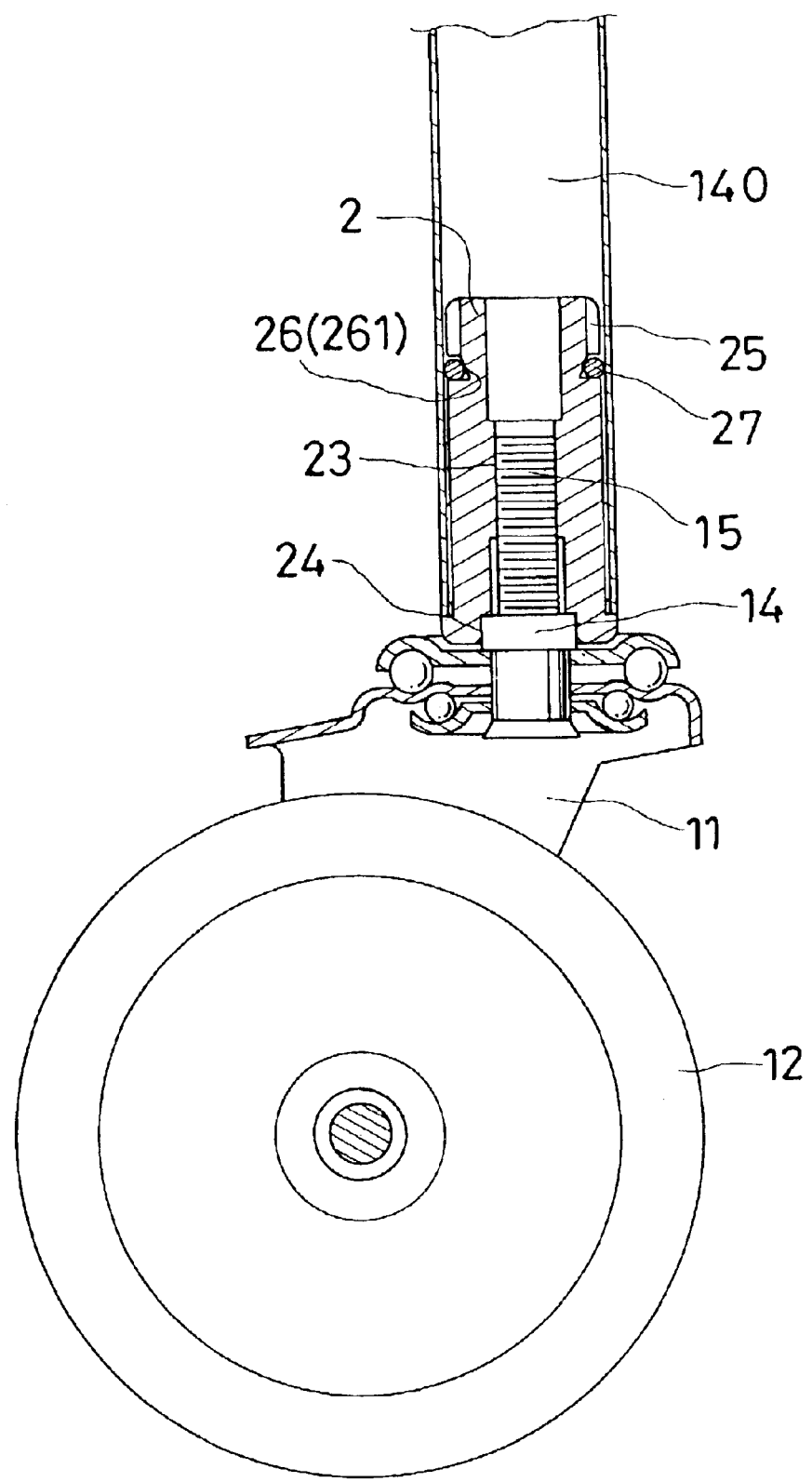
FIG. 2 is a cross-sectional view of the wheel of a rack according to the present invention.

The supporting platform 13 is formed with a polygonal portion, a round step-shaped portion 14 on a middle portion of the polygonal portion, and a screw 15 projecting upwards from a middle portion of the step-shaped portion 14; the platform 13 is further formed with an annular trench (not numbered) around a lower end of the step-shaped portion 14, as shown in FIG. 2.

Figure 4:
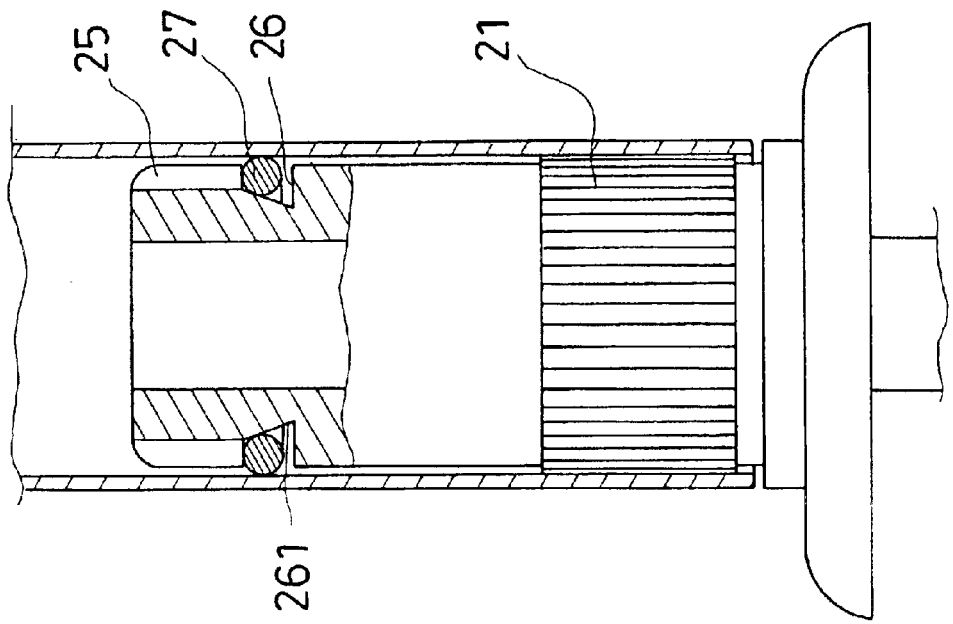
FIG. 4 is a partial cross-sectional view of the wheel of the invention, showing the other function of the C-shaped ring.
Figure 3:
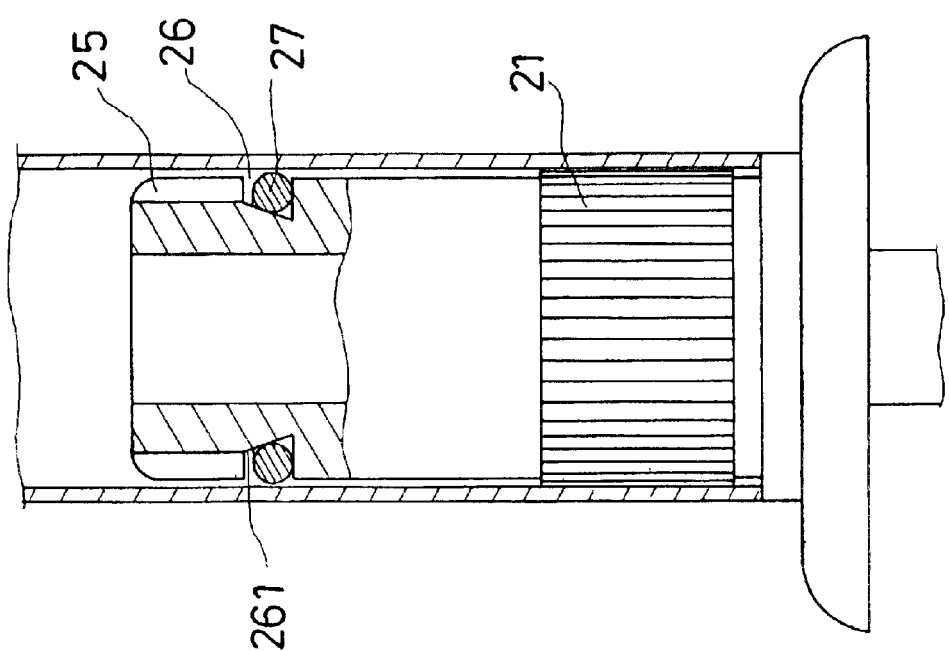
FIG. 3 is a partial cross-sectional view of the wheel of the invention, showing one of the functions of the C-shaped ring.
Figure 5:
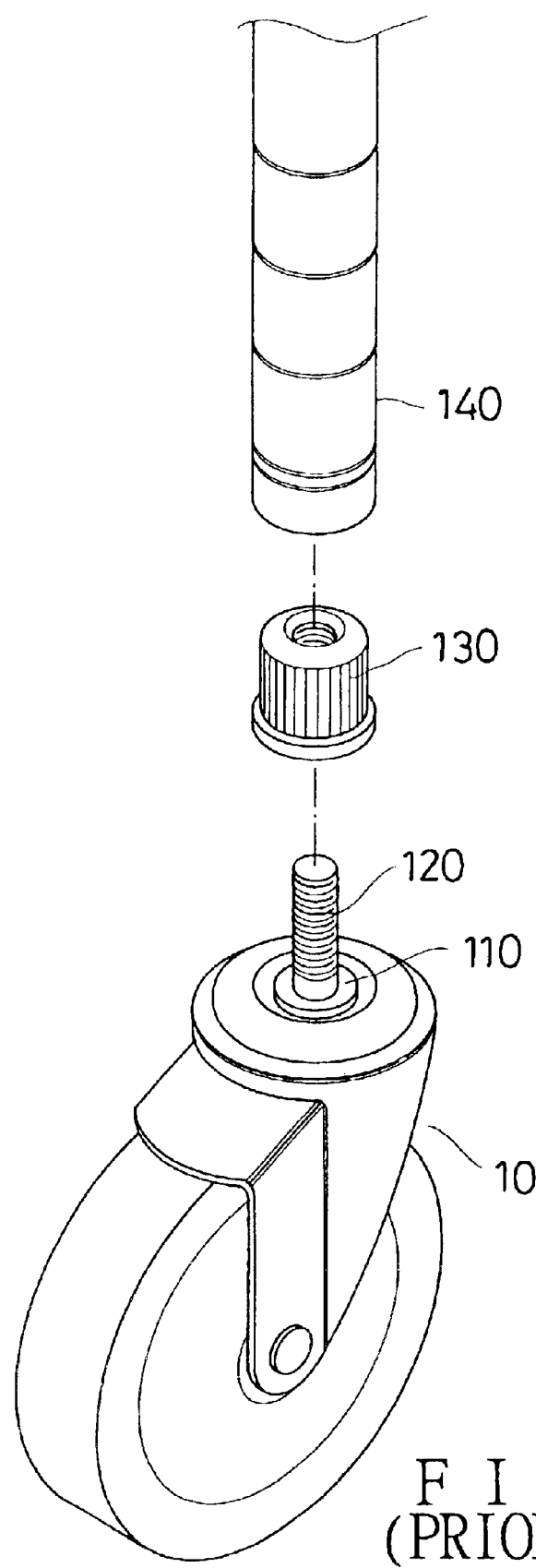
FIG. 5 is an exploded perspective view of the conventional wheel of a rack as described in the Background.
Figure 6:
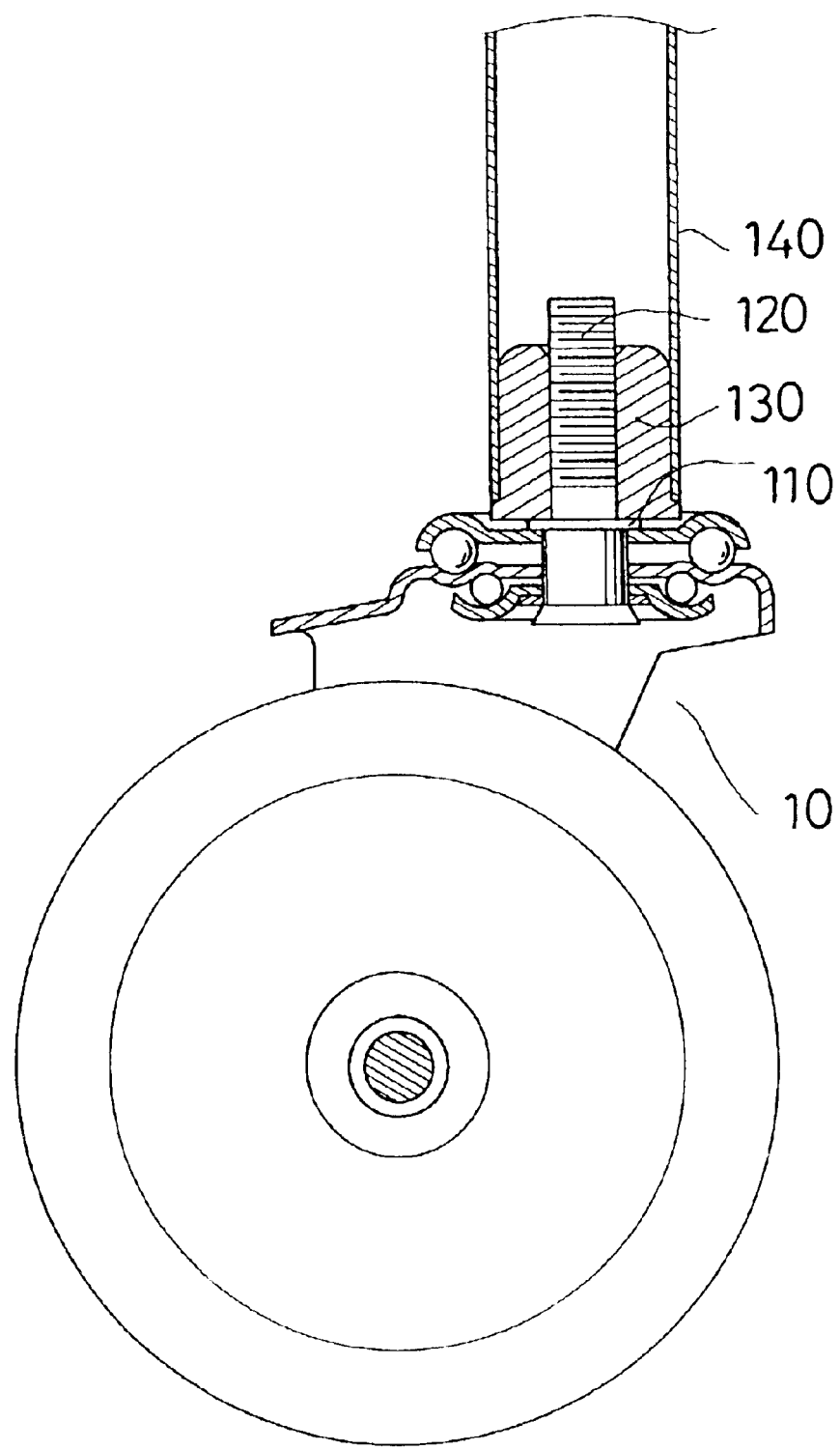
FIG. 6 is a cross-sectional view of the conventional wheel of a rack.

The connecting sleeve 2 is formed with a corrugated surface 21 on a lower portion of an outer side thereof, an elongated extension portion 22, a central screw hole 23 extending up from a bottom thereof, a round cavity 24 on a lower end for fitting with the step-shaped portion 14 of the supporting platform 13, at least one trench 25 formed on an outer side thereof and extending from a top of the elongated extension portion 22, and an annular groove 26 formed on the outer side of the elongated extension portion 22 and in communication with the trench 25; the trench 25 is provided for allowing plating liquid to flow through when the sleeve 2 is being plated; the edges of the trench 25 can form friction with an inner side of a vertical tube 140 of a rack when the sleeve 2 is fitted into the tube 140; the annular groove 26 is shaped such as to have an annular sideways facing portion 261 similar to an middle section of an outer side of an inverted cone, as shown in FIGS. 2 to 4, i.e. a lower section of the annular sideways facing portion 261 is smaller than an upper section in diameter; the sleeve 2 further has an annular protrusion 28 at a lower end for fitting in the annular trench of the platform 13.

A C-shaped ring 27 is provided for fitting around the annular groove 26; the C-shaped ring 27 is relatively resilient, and can be enlarged when force is exerted sideways on the inner edges thereof. In addition, the C-shaped ring 27 is formed with such a size as to project at least slightly beyond the annular side of the sleeve 2 when it is located around the smaller lower section of the annular sideways facing portion 261.

In combination, the sleeve 2 is joined to the support 11 with the screw hole 23 being screwed to the screw 15, and with the round cavity 24, and the annular protrusion 28 being respectively fitted with the step-shaped portion 14, and the annular trench (not numbered) of the platform 13. A wrench can be fitted around to the polygonal portion of the platform 13, and turned to help secure the connection. The C-shaped ring 27 is positioned around the annular groove 26. Then, the connecting sleeve 2 is tightly inserted into a lower end of a vertical tube 140 of a rack with both the corrugated surface 24 and the C-shaped ring 27 being in close contact with the inner side of the tube 140, as shown in FIG. 2.

Referring to FIG. 3, because the C-shaped ring 27 projects beyond the annular side of the sleeve 2, it can closely contact with the inner side of the tube 140 to help prevent the sleeve 2 from falling out of the tube 140 even if it is located around the smaller lower section of the annular sideways facing portion 261.

Referring to FIG. 4, the C-shaped ring 27 will be relocated around the larger upper section of the annular sideways facing portion 261, and enlarged to have a bigger diameter when the sleeve 2 is moved down relative to the tube 140 therefore the C-shaped ring 27 can form still firmer connection with the tube 140 if an external downward force is exerted on the sleeve 2. In other words, the C-shaped ring 27 can effectively prevent the sleeve 2 from falling off.

From the above description, it can be easily understood that besides the C-shaped ring 27 preventing the wheel from separating from the tube 140, the wheel of the present invention has advantages as followings:

1. The wheel can be steadily connected to the lower end of the vertical tube 140 of the rack because of friction between the corrugated surface 21 of the sleeve 2 and the tube 140.
2. The sleeve 2 has the round cavity 24, and the annular protrusion 28 respectively fitting with the step-shaped portion 14, and the annular trench of the supporting platform 13 therefore it is very steady on the platform 13, and in turns, service life of the wheel will be longer.
3. The elongated extension portion 22 makes the sleeve 2 still steadier.
4. The wheel has a polygonal portion on the supporting platform 13 therefore a wrench can be used to help increase the firmness of the combination.

What is claimed is:

1. An improvement on a wheel of a rack, comprising
a wheel support for holding a wheel part in position;
a sleeve inserted into a lower end of one of vertical support tubes of a rack and having a central screw hole;
a supporting member for supporting the sleeve; the supporting member being turnably connected to a top of the wheel support; the supporting member having a polygonal portion for allowing a wrench to be used on; and
a screw projecting upwards from a middle of the polygonal portion and screwed into the screw hole of the sleeve;

and being characterized by:

a round step-shaped portion formed on a middle of the polygonal portion, and a round cavity formed on a lower end of the sleeve for fitting with the round step-shaped portion;

a corrugated surface formed on an annular portion of a lower end of the sleeve, and an elongated extension portion at an upper end of the sleeve; and an annular groove formed around an outer side of the elongated extension portion of the sleeve, and a resilient and enlargeable C-shaped ring fitted around the annular groove; the annular groove being shaped so that a sideways facing annular portion thereof tapers off towards a lower end; the C-shaped ring being in contact with an inner side of the vertical support tube.

2. The wheel of a rack as claimed in claim 1, wherein the C-shaped ring projects beyond the sleeve when it is located around the lower end of the sideways facing annular portion of the annular groove.

3. The wheel of a rack as claimed in claim 1, wherein the sleeve has a plurality of trenches formed on an outer side thereof, extending from a top and in communication with the annular groove.

* * * * *